Jan. 16, 1934.  C. F. BETZ  1,943,364
PISTON PIN ASSEMBLY
Filed March 27, 1933
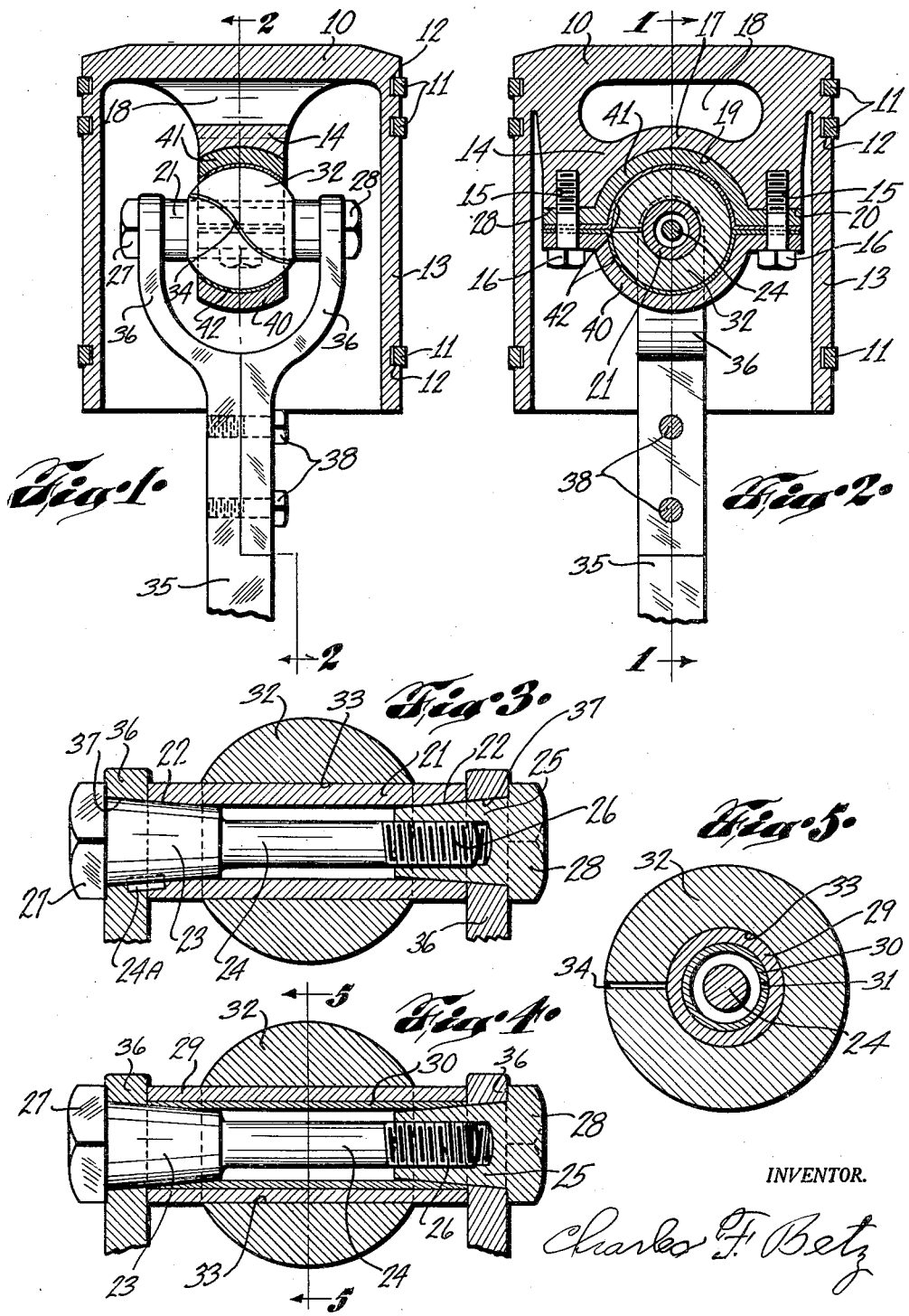
INVENTOR.
Charles F. Betz Patented Jan. 16, 1934

1,943,364

UNITED STATES PATENT OFFICE 1,943,364

PISTON PIN ASSEMBLY

Charles F. Betz, East St. Louis, Ill.

Application March 27, 1933. Serial No. 662,973

11 Claims. (Cl. 309—20)

This invention relates to improvements in piston pin assemblies, and more particularly to an improved structural arrangement of piston, connecting rod and the associated pin assembly, for use in internal combustion engines.

In the present quantity production of connecting rods for internal combustion engines, particularly those of automotive type, the rods are very often somewhat bent or deformed in such a manner that the outer or pin end of the rod, does not lie exactly in the plane of the inner or crank shaft end of the rod. An assembly embodying a connecting rod which is even slightly so distorted tends to prevent a truly rectilinear reciprocating movement of the piston, except as confined to a straight line movement by the walls of the cylinder in which it is used. There is thus set up, in operation, a turning moment, with the result that a piston connected to a deformed rod, tends to become cocked, and to travel diagonally within its cylinder. After a few thousand miles of driving, an automotive engine operating under these conditions becomes inefficient, due to an excessive rate of wear resulting in a deformation of the initially true circular section of the cylinder. The present invention has as its general object, the elimination of the several difficulties due to the aforesaid causes.

A further object of the invention is attained in a minimization of stresses imparted laterally of the cylinder wall, through the piston, piston pin and connecting rod. It is customary, in automotive practice, to allow an end play of the crank shaft, to an extent say of one-eighth to one-fourth of an inch. During the periods of use in which the engine is propelling the associated vehicle, the piston tends to be forcibly drawn to one, usually the rear, side of the cylinder, with an opposite effect when the car is running ahead of the engine. This condition prevails with great frequency, particularly in those vehicles provided with an overrunning clutch or analogous equipment. The resulting repeated oscillation of the crank shaft, along its axis, and the consequent frequent reversal of lateral piston stresses, results in a tendency of the piston to wear the cylinder out of round, usually somewhat oval in cross section. It will be noted that this result occurs, even though there may be no distortion or misalignment of the connecting rod as originally formed. The present invention objectively attains a minimization of all such lateral stresses by providing a full-floating relation between the piston and connecting rod, whereby the cylinder and piston are relieved of wear incident to objectionable lateral stresses.

A still further object of the invention is attained in an improved piston pin and assembly, which greatly facilitates repair, and minimizes the cost of replacements incident to wear occurring between the rod and piston. This object is attained as a result of a novel arrangement of easily replaceable wearing elements.

Yet another object of the invention consists in the provision of an improved ball and socket piston-pin and rod connection, which, coacting with other features hereinafter appearing, provides the full-floating arrangement heretofore noted.

Additional objects are attained in an improved construction of piston; an improved piston pin and means for locking same to the connecting rod; an improved method of securing the piston pin assembly and piston together, whereby the rods and pins may be pulled without removing the piston from the cylinder, and according to which a piston may be constructed with its walls or skirt practically imperforate.

The foregoing and other objects will appear in greater detail from the description which follows, covering certain preferred embodiments of the invention, considered in connection with the drawing, in which:

Figs. 1 and 2 are vertical sectional elevations of a piston, piston pin and rod connection constructed according to the present invention, the sectional planes of Figs. 1 and 2 being indicated each on the other figure, by the lines 1—1 and 2—2 respectively; Fig. 3 is a sectional elevation through a piston pin and bushing assembly such as employed in Figs. 1 and 2; Fig. 4 is a view similar to Fig. 3 except as showing the use of an auxiliary expansion element or sleeve, within a hollow piston pin, and Fig. 5 is a section along line 5—5 of Fig. 4.

Referring to the drawing by characters of reference, there is illustrated in Fig. 1, a piston which includes a head or crown portion 10; rings 11, which may be of any suitable form and seated in suitable grooves 12 therefor, and a skirt portion 13 which is preferably, and according to the construction of Fig. 1, substantially imperforate. In describing the skirt portion as imperforate, it will be understood that the piston is, of course, open at its inner or lower end. The skirt portion 13 is, however, according to preference, characterized by absence of the usual transverse openings provided for the introduction of a piston- or wrist-pin. Formed as a part, and extended inwardly of the piston in depending relation to the head or crown 10, is a pin-bracket or boss structure 14, shown as consisting of a single element secured only to the head or crown of the piston, while substantially free of securement to the skirt portion. The bracket 14 is shown in preferred form as consisting of a single element.

Extended vertically and depthwise of the lower end faces of the bracket 14, are tapped apertures 15, one near each side of the bracket 14. Suitable cap screws or bolts 16 engage the apertures 15 therefor, for assembly purposes, as will appear. Between the crown proper 10, and a saddle portion 17, of the pin bracket, may be formed an air pocket or space 18, which serves, in a certain measure, to insulate the pin assembly from the extreme heat of the central areas of the crown, and tends to divert the path of travel of this heat, outwardly toward the periphery of the crown, as well as the skirt, where it may be radiated to the cooled walls of the cylinder. The lower or inner surface of the saddle portion 17 is of arcuate transverse section as appears in Fig. 1, and is also of arcuate section considered with respect to its opposite dimension as appears in Fig. 2, thus forming a partly spherical hollowed surface 19, for a purpose hereinafter appearing. The surface 19 terminates laterally in plane or shouldered areas 20, one at each side of the bracket, there being located centrally of these areas, the apertures 15 for the assembly screws 16.

The piston pin proper is shown in preferred form in Figs. 3–5, as consisting of a tubular or hollow element 21 with open ends, the endmost surfaces of the bore through the pin being slightly enlarged or tapered divergently as indicated at 22, according to the construction of Fig. 3. The tapered surfaces 22 serve to receive correspondingly tapered external surfaces 23 formed adjacent the head portion of a pin assembly bolt 24, and likewise on the surface of a nut 25 which is threaded as at 26 to engage the threaded end of bolt 24. Both the bolt and nut are provided with polygonal, say hexagon, heads indicated at 27 and 28 respectively. In order positively to preclude rotation of the bolt and pin within the apertures of the rod arms, and thus to confine the wear to the bushing, pin and other easily replaceable elements, I may provide a key element 24A, engaging a suitable slot in the bolt and a similar extension of such slot in the end of the pin. The key may be formed integrally with one of the arms of the connecting rod, or may consist of a separate element.

In the structure of Fig. 4 the same assembly bolt 24 may be employed, as in the arrangement of Fig. 3, but a hollow pin 29 is, in the latter construction, provided with a bore of even diameter throughout its length, and serves to receive a somewhat resilient sleeve 30 (Figs. 4 and 5), the sleeve being of tubular aspect and provided with a single longitudinal cut from end to end as shown at 31 (Fig. 5).

Adapted for disposition intermediate the ends of the pin, is a spheroidal bushing member such as the ball-like element 32. This bushing may be initially formed in, or turned down to substantially spherical form, and is provided with a diametral bore 33 conforming substantially to the external diameter of the pin 21 or 29. The bushing 32 is also diagonally slotted, by great preference with only a single slot as shown at 34, so that as the rod, hereinafter described, is clamped in assembly, about the bushing, the bushing may, if desired, be brought into close fitting relation with the pin, such as 21. In the arrangement illustrated, it is, however, not desirable to constrict the spherical bushing to too great an extent, but it is preferred to permit the bushing to work somewhat on the pin, since the pin, as later appears, is held against rotation with respect to the rod. The bushing is further not so tightly clamped as to prevent its free movement endwise of the pin, this free end movement serving to prevent transmission of lateral stresses from the rod to the piston.

A connecting rod indicated generally at 35, is attached by means of any of the usual sleeve or other prevailing types of bearing, to the associated pin or crank of the crank shaft. It may be noted as my distinct preference to avoid a connection of ball and socket type at the inner or lower end of the rod. The piston end of rod 35 is characterized by a U-shaped, forked or furcate end, the arms or furcations of which are spaced at opposite sides of the prolonged axis of the rod, and are each further spaced from the corresponding side of the bracket 14, a substantial distance, so as to permit a free movement of the rod in response to crank shaft end or axial movement. I have shown the piston end of the rod as consisting of two such arms 36, each transversely apertured at or near its outer end, and the apertures being tapered, as appears in Figs. 3 and 4, to correspond with the tapered male surfaces of the bolt 24 and the nut 25. It will appear from the assemblies of Figs. 1, 3 and 4 that the pin is disposed in bridging relation, across the apertured ends of the arms 36, and that the spacing of the arms is substantially equal to the length of the pin.

I have shown as my preference, one of the arms 36, in Fig. 1, to be formed integrally with the rod 35, and the other thereof detachably secured to an undercut seat therefor, and by means of screws 38, to the integral arm.

Proceeding now to a description of the journal and wearing portions of the assembly which coact with the bushing 32, heretofore described, there are employed by preference two bearing or cap elements which may conveniently be termed a lower half 40 and an upper half 41, each consisting of a central cup-like portion of a size and shape to seat firmly upon and embrace the bushing 32, the cups being provided with laterally extended ear portions apertured in register to receive the bolts 16, whereby the two halves are assembled about the bushing 32 in journalling relation. By preference also disposed between the cups 40 and 41, are a pair of shims or filler members 42, one serving as a liner in each of the cups 40—41. It is my preference for economy in production to form the shims 42 as by die pressing, so that they may be uniform.

In assembling the parts of the described arrangement, it will appear that the rod and pin elements may be completely assembled and the whole inserted in and secured to the bracket 14 as a final operation, by inserting and taking up the screws 16. The order of events as will have been implied from the description of parts, is as follows:

Assuming the rod 35 to have assembled thereto the arm or arms 36, as by bolts 38, a liner such as 30, in the structure of Fig. 4, will be inserted in the pin 29, the bolt 24 inserted through one of the openings 37 and the nut applied to the opposite end of the bolt and threaded up firmly. The bushing 32 will, of course, have been disposed on the pin before inserting the pin in bridging relation between the arms 36. The shims or fillers are now inserted between the caps 40—41, and the caps disposed with their bolt openings in register, and with the cupped portions of the shims and caps embracing the bushing 32. This assembly may now be inserted through the open end of the piston, and the cap screws threaded into the openings 15 therefor.

It will appear from the foregoing description of parts that only one of the cupped bearing caps, such as 40, need be employed, and also that the shims may, as desired, be omitted entirely, or employed in any selected number in each or either of the caps. It is, however, considered more desirable for economy of replacement for wear, to employ the paired caps 40—41 with the intervening shims or fillers.

It is to be noted as my distinct preference to construct the bushing 32 as a single element provided with a single lateral slot 34. According to this arrangement, adjustment is greatly facilitated, as compared with an arrangement employing a bushing formed of two mating parts or companion halves.

It will appear from the drawing and description of parts that, in case the connecting rod utilized with the described piston and pin assembly, is misaligned or otherwise distorted, no twisting or cramping stresses can be imparted from the rod to the piston. Thus the path of movement of the piston is determined entirely by the cylinder wall, which over a long period of use, remains circular in section, and is not worn out of round, scored or grooved in any manner resulting either from deformation of the rod, nor from lateral stresses which heretofore might be imparted to the piston responsively to axial movement of the crank shaft. It will appear from the spacing between the arms 36, and the sides of the bushing 32 and bracket 14, that the latitude of movement provided for by the spacing of arms 36 in a direction transversely of the piston, also permits shifting movement backward or forward of the cylinder according to normal variation in rod position responsively to different engine working conditions, as above discussed.

The present application constitutes a continuation, in part, of my application, Serial No. 616,897, filed June 13, 1932, entitled "Engine pistons and piston pins." The present subject matter, while embodying some of the structural features of the original, somewhat more fully attains the results and the several objects recited therein, and also fully attains the several objects hereinabove enumerated.

I claim:

1. In a piston, pin and connecting rod assembly, a piston, a piston-pin bracket dependingly supported from the piston crown, a connecting rod having arms spaced to extend on opposite sides of said bracket, a piston pin free of connection with the skirt of the piston, and bridging said rod arms, a bushing element embracing said pin between its ends, a cap structure coacting with said bracket to form a journal for said bushing element, means for detachably securing said cap structure to said bracket, and means for detachably securing the piston pin to the rod arms.

2. In a piston, pin and connecting rod assembly, a piston, a piston pin bracket dependingly supported from the crown or top of the piston, a connecting rod having arms spaced to extend on opposite sides of the pin bracket, a piston pin free of connection with the skirt of the piston, and detachably carried by said rod arms, a one-piece, partly spherical bushing element embracing said pin intermediate its ends, detachable journal elements coacting with said bracket to embrace said bushing element, means for detachably securing the journal elements to said bracket, and means for securing the piston pin against rotation within the said arms of the connecting rod.

3. In a piston, pin and connecting rod assembly, a piston, a pin bracket supported interiorly of the piston by the piston crown, a connecting rod having a furcated end extending into the piston, the furcations being spaced apart a distance substantially greater than the width of said bracket, a pin assembly bridging said furcations, a part-spherical bushing carried intermediately of said pin assembly, and means secured to and coacting with the bracket, to form a partly spherical journal for said bushing.

4. In a piston, pin and connecting rod assembly, a piston, a pin bracket supported interiorly of the piston and by the piston crown, a connecting rod having a furcated end extending into the piston, the furcations being spaced apart a distance substantially greater than the width of said bracket, a pin assembly bridging said furcations, a part spherical bushing carried intermediately of said pin assembly, and a two-part hollow structure secured to and coacting with the bracket, to form a partly spherical journal for said bushing.

5. In a piston and connecting rod assembly, in combination with a piston, a pin-supporting bracket dependingly carried by the crown portion of the piston, and disposed diametrally of the skirt portion, a connecting rod having a forked end, the arms of the fork being spaced laterally of said pin bracket, a pin structure secured in bridging relation to the said arms, a partly spherical bushing centrally apertured to receive the pin structure, and one or more cupped plates detachably secured to the bracket to receive the spherical bushing in journalling relation within their cupped portions, the plates, bushing and pin being assembled to permit free axial movement of the pin with respect to the plates, bushing and bracket.

6. A piston and connecting rod assembly including a piston having substantially imperforate skirt walls, a diametral boss dependingly supported from the crown of the piston, but substantially free of the skirt, a rod having a pair of arms spaced apart from the opposite sides of said boss, a pin bridging said arms, a spheroidal bushing element, provided with a central bore for said pin, a slot in one wall of said bushing, for take-up purposes, a chambered plate structure partly enclosing said bushing, and detachably secured to the under surface of said boss, and means detachably securing said pin in non-rotatable relation to said arms.

7. In a piston and connecting rod assembly, in combination with a piston, a connecting rod having a U-shaped end, a pin detachably bridging the arms of the said end, a spheroidal bushing centrally embracing the pin, a pair of opposed plates centrally chambered to journal said bushing, and means for securing said plates within the piston, said means being applicable and adapted for manipulation through the open end of the piston.

8. In a piston and connecting rod assembly, in combination with a piston, a connecting rod having a U-shaped end, a pin detachably bridging the arms of the said rod end, a one-piece spheroidal bushing centrally embracing the pin and provided with a single lateral slot, a pair of opposed cap members, the cap members being centrally and oppositely hollowed to provide a chamber for journalling said bushing, and holding screws for securing said caps within the piston, said screws extending parallel to the axis of the piston and applicable through the open end thereof.

9. A connecting rod and piston pin assembly including a pin, a rod having a U-shaped upper end, the arms of which are spaced apart a distance substantially equal to the length of the pin, and means forming a ball and socket structure for connection to a piston, said ball and socket structure being of lesser width than the spacing of said arms.

10. In a connecting rod and piston pin assembly, a piston pin, a rod having a U-shaped outer end, the arms of which are spaced apart a distance substantially equal to the length of the pin and bridged thereby, the arms being apertured in line with the pin, and the pin being provided with a bore therethrough, a bolt extending through the pin, a nut engaging the threaded end of the bolt, means associated with the pin and arms for holding the pin against rotation therein, means forming a ball and socket structure for connection of the pin to the piston, said connecting structure being of lesser width than the length of the pin and the spacing of said arms.

11. In a piston, pin and connecting rod assembly, a piston characterized by imperforate skirt walls, a pin-bracket depending from the crown or top of the piston and of elongate form and a trend diametrally of the skirt, the bracket being provided with a centrally recessed face, and tapped stud-receiving apertures at opposite extremities of the face, a connecting rod having a U-shaped end, the arms of which are spaced apart a distance substantially greater than the width of said bracket, and apertured to receive portions of a pin structure, a pin structure carried by the arms, and having threadedly connected parts for assembly thereto, the pin structure being of a length substantially equal to the spacing of said arms, a one-piece spheroidal bushing, laterally slotted, and embracing the central portion of the pin structure, a pair of centrally cupped plates, the cupped portions of which coact to journal said bushing, one or more plate-conforming spacers or shims between said plates, the plates being apertured near their ends in register with said bracket apertures, and studs coacting with the plate and bracket apertures to secure the plates to said bracket.

CHARLES F. BETZ.